Jan. 6, 1931. F. R. DIETRICH 1,788,190
TURNING GEAR FOR THE HEADLIGHTS OF VEHICLES
Filed Dec. 8, 1928 2 Sheets-Sheet 2
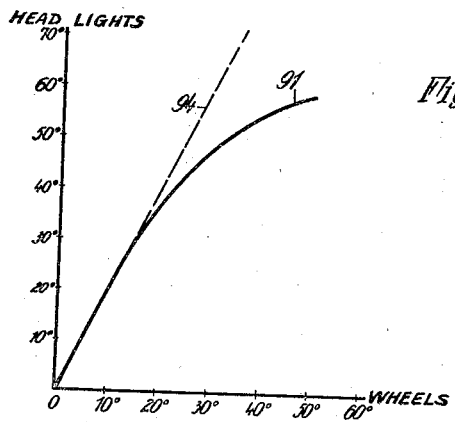
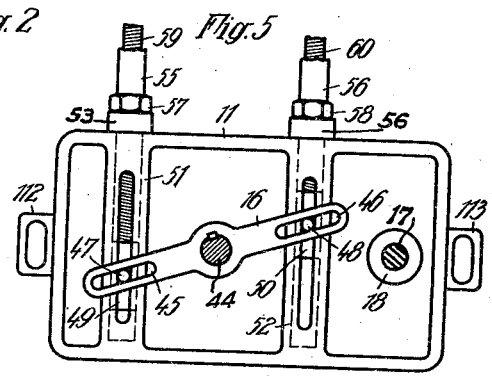
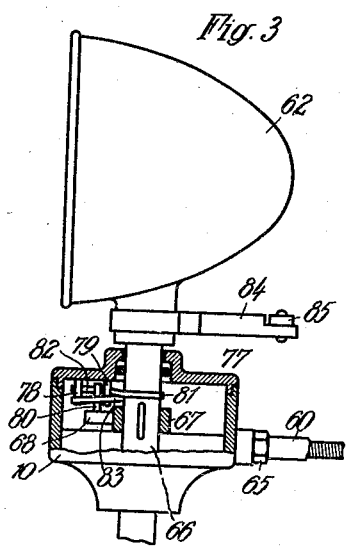
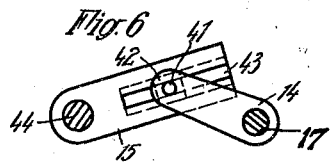
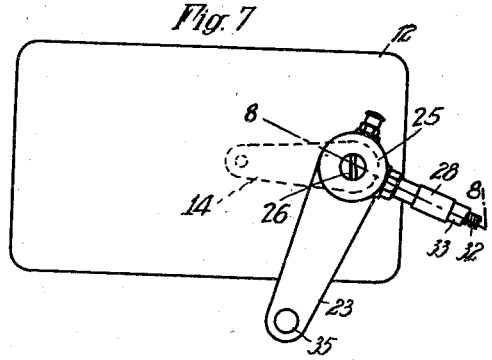
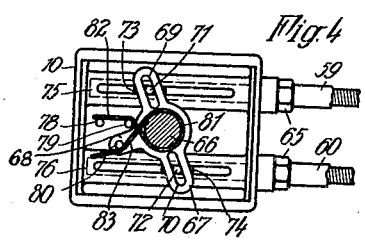
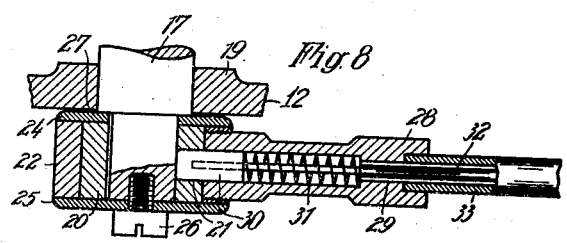
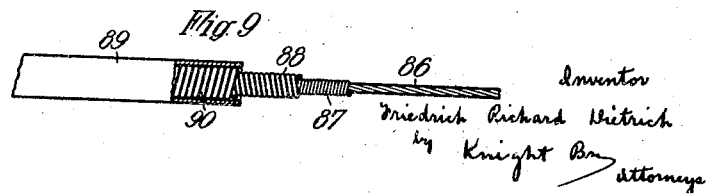
Inventor
Friedrich Richard Dietrich
by Knight Bro
Attorneys Patented Jan. 6, 1931

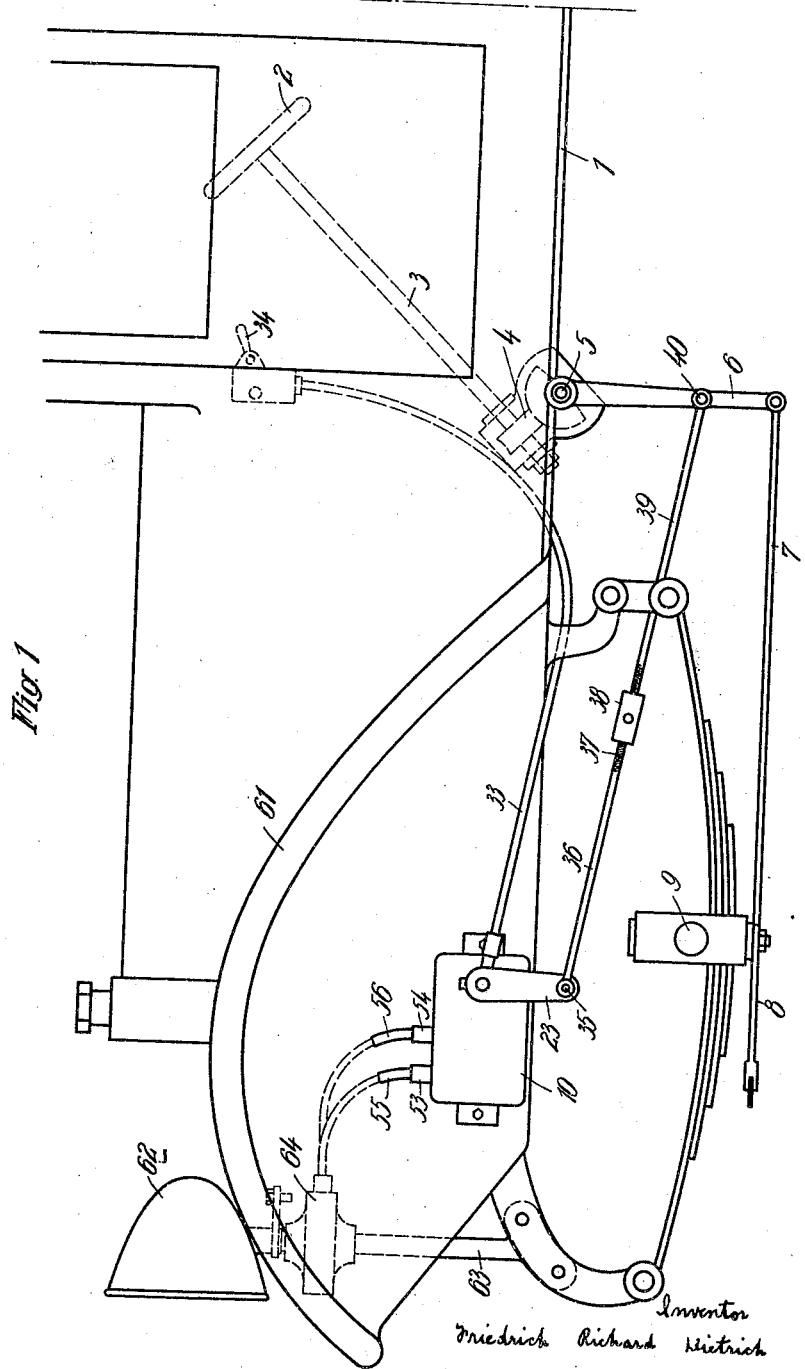

1,788,190

UNITED STATES PATENT OFFICE

FRIEDRICH RICHARD DIETRICH, OF PASING, NEAR MUNICH, GERMANY

TURNING GEAR FOR THE HEADLIGHTS OF VEHICLES

Application filed December 8, 1928, Serial No. 324,630, and in Germany December 23, 1927.

My invention relates to improvements in turning gear for the headlights of vehicles in accordance with the angular positions of the steering wheels, and more particularly to a mechanism for turning the headlights or the light beams issuing from them, of automobiles.

One object of my invention is to turn the headlights of vehicles, or their beams, in such a manner, that the road is not only lighted up when travelling straight ahead, but also when negotiating curves in the road.

A further object of my invention is to design the turning mechanism for the headlights in such a manner, that it may easily be adapted to the various forms of chassis of automobiles.

Another object of my invention is to construct the turning mechanism in such a way, that parts liable to rapid wear due to the constant vibrations of the vehicle, such as gear wheels and the like, are eliminated.

A still further object of my invention is to protect all sensitive parts of the mechanism against water, dust and mud by enclosing them securely, but so that the pleasing appearance of the automobile does not suffer thereby.

According to my invention the mechanism for turning the headlights or their beams is equipped with a member inserted between the steering mechanism of the vehicle and the parts of the headlight rotatably mounted on the body of the vehicle, said member being adapted to convert the uniform turning speed of the steering apparatus or the steering wheels into a turning speed of the headlights, which is quicker on the average and is retarded as the deflection increases. Preferably this transmission member operates so that the turning speed of the headlights within the range of comparatively small angles of deflection is at least equal to double the turning speed of the steering wheels. At comparatively large angles of deflection the turning speed of the headlights decreases more and more, so that even comparatively large changes in the angular deflections of the steering wheels cause small deflections of the headlights or the beams of light emitted by them.

It is not necessary, that the entire headlight including its housing participates in the turning movement, but it is sufficient that the reflector with or without the source of light is turned, or that mirrors or prisms located in the path of the beam of the headlight are turned through corresponding angles.

According to a preferred embodiment of my invention the transmission member interposed between the steering mechanism of the vehicle and the movable headlight portions comprises a box or case mounted on the body of the vehicle, and at least one rotary member, located in said box and the shaft of which projects through a packing in the wall of said box and carries, for instance, a lever, which is connected with the steering lever of the steering mechanism. Below the headlight is provided a second box containing a further rotating member, which is connected with the movable parts of the headlight. The first and the second box are tightly connected by at least one flexible conduit which maintains the change of shape imparted to it, such as a copper tube. In this copper tube is located a flexible power transmitting member, such as a Bowden wire which transmits the motion of one movable or rotary member to the other. By means of this mechanism it is possible to adapt the turning mechanism of the headlights to the various systems of chassis. All sensitive parts of the mechanism are furthermore protected against water and dirt by this enclosure.

An embodiment of my invention is illustrated in the drawings affixed hereto and forming part of my specification.

In the drawings

Fig. 1, shows the complete assembly of the mechanism for turning the headlights of an automobile, Fig. 2, a diagram explaining the dependence of the deflection of the beam of the headlight from the angular positions of the steering wheels, Fig. 3, the headlight and the portion of the turning mechanism connected therewith in sectional side-elevation, Fig. 4, the same part of the turning device in section along the line A—B of Fig. 3, Fig. 5, shows the open casing of the head light operating gear box shown in Fig. 1 at 10, Fig. 6, shows the lever mechanism mounted on the back of the box cover 12, Fig. 7, shows the front of box cover 12, Fig. 8, shows a section along line 8—8 of Fig. 7, and Fig. 9, a preferred construction of the flexible power transmitting means.

Referring to Fig. 1 of the drawing it will be seen that on the chassis 1 of the automobile are mounted the steering wheel 2 on the steering column 3, the worm gear 4, the worm shaft 5 and the steering arm 6. The steering arm 6 is connected by means of the connecting rod 7 with the steering mechanism 8 of the front wheels revolving upon the axle 9 but which are omitted in the drawings for the sake of clearness.

On the chassis is also mounted the operating gear box 10 shown in detail and on a larger scale in Figs. 5 to 8 of the drawings. The box consists of the casing portion 11 (shown open in Fig. 5) attached to the chassis at the inside of the front mud guard 61 (Fig. 1) by the lugs 112, 113, the casing being closed by the detachable cover 12. In this box are housed the movable arms 14, 15, 16. Arm 14 which is located on the underside of cover 12 (Fig. 7) but is shown in detail in Fig. 6, is keyed to the shaft 17 whose inner end rests in a step bearing 18 at the bottom of the box, the shaft being journalled in and tightly passed through the cover 12 at 19. Upon the outer end of the shaft 17 outside of cover 12 (Figs. 7 and 8) is fixed the ring 20 provided with the radial bore 21. The ring 20 is embraced by the eye 22 of lever 23. This lever is normally free to turn on ring 20, being guided by the flanges 24, 25, flange 25 being held on the shaft 17 by means of the screw 26. The flange 24 is clamped between the shoulder 27 of this shaft and the ring 20.

Into a radial bore in the eye 22 of lever 23 is screwed a tubular stud 28, which at the inner wall is provided with a collar 29. In the tube 28 is slidingly disposed a bolt 30, which is forced against the shaft 17 by the spring 31, resting at its other end against collar 29. Bolt 30 is fixed to the end of the draw member 32 of the Bowden wire located in the flexible tube 33. This Bowden wire leads to a handle 34 within easy reach of the seated driver, (Fig. 1), so that when handle 34 is released, spring 31 is able to force bolt 30 into bore 21 of ring 20, thereby coupling lever 23 to shaft 17.

As shown in Fig. 1, to lever 23 is linked at 35 an operating rod composed of two sections 36, 39, which are joined together by turnbuckles 38 so as to permit the adjustment of the operating rod to the desired length. The section 39 of this rod is linked at 40 to the steering arm 6 of the steering gear by which lever 23 of the headlight control mechanism is operated.

At the outer end of arm 14, as shown in Fig. 6, is rotatably journaled the slide block 42 guided in a dove-tailed slot 43 of an arm 15, mounted on the shaft 44, journalled in casing 11, and to which is also keyed double armed lever 16. Shafts 17 and 44 are parallel to one another, and arms 14, 15 are mounted respectively on these shafts in such a manner that the pivotal pin 41 of block 42 is located in the plane placed through the two shafts (which may be termed the neutral position) when the car travels straight ahead. The distance of pin 41 from the shaft 17, at least when travelling along a straight road, is greater than the distance from shaft 44. The purpose of this arrangement is to impart to arm 15 and shaft 44 a greater angular speed at small movements of arm 14 from neutral position, and a comparatively much smaller angular speed, when arm 14 has been turned and is moving at a greater angular distance from its neutral position. Thus, at slight turning angles of the vehicle steering gear a large turning motion, and at large turning angles of the steering gear a small turning motion is imparted to the headlights by the transmitting mechanism which will now be described.

The two arms of lever 16 are provided with radial slots 45, 46 which are engaged respectively by detents 47, 48 provided on slides 49, 50 which latter are guided in the tubular guides 51, 52 provided in and running transversely through box 11.

On box 11 are provided tubular studs 53, 54, which are extensions of guides 51, 52 and to which are tightly joined the flexible pipes, such as copper pipes, 55, 56 by means of nuts 57, 58. In these pipes slide the flexible power transmitting means such as the Bowden wires 88, which will be fully described later with reference to Fig. 9 of the drawings.

The pipes 55, 56 are passed through the mudguard 61 to the box 64 mounted rigidly on the supporting pillar 63 below the headlight 62, where they are tightly connected to tubular studs of this box by means of the nuts 65. In box 64 is journaled the shaft 66 of the headlight 62, but so that it cannot slide in an axial direction.

Upon shaft 66 is fixed the double armed lever 67, radially slotted as shown at 69 and 70, and provided with a detent 68 carrying an axially directed pin 80.

Slots 69, 70 are engaged respectively by studs 71, 72 of the slides 73, 74 which are guided in tubular guides 75, 76 of the box 64 and connected with the flexible power transmitting shafts 59, 60.

On the inside of the cover 77 of the box 64 are mounted the studs 78, 79 which serve as an abutment for both ends 82, 83 of a coil spring 81, disposed on shaft 66. Stud 80 is mounted on its detent 68 a sufficient distance from the shaft center, so that it passes between fixed studs 78, 79. As a consequence, when stud 80 passes in one or the other direction out of alinement with studs 78, 79, it engages one or the other end of spring 81, the end of the spring not engaged by stud 80, abutting against studs 78, 79. Thus this spring always tends to turn the headlight into a position in which studs 78, 80, 79 are in alinement. This arrangement is adjusted in such a manner, that when the three studs 78, 80, 79 are in alinement, the beam of light of the headlight is projected straight ahead.

On the headlight 62 is mounted the arm 84, which by the connecting rod 85 is coupled with a corresponding arm of the second headlight, not shown in the drawings.

The flexible power transmitting means provided between the boxes 11 and 64 are preferably constructed of a core 86, Fig. 9, of fine wires, mainly located in the direction of the pull, which are reinforced by a covering layer of thicker wires substantially placed transversely to the direction of the pull. Preferably this layer is formed by a helically wound wire 87. If desired a second layer 88 helically wound in opposite direction may be provided.

As guiding member for the flexible power transmitting means a flexible pipe 89, which maintains the form given to it, is used, such as a copper pipe, which may be lined with a helically wound wire 90. Care must be taken, that this helical lining is wound opposite to the direction in which the outermost wire helix 88 of the operating member is wound. By this design of the power transmitting means the friction is reduced and the life extended. As the pipe 89 maintains its form after bending it into the desired shape, idle travel of the operating member is practically eliminated.

My improved operating mechanism operates in the following manner: When turning the steering wheel 2 the steering arm 6 is rocked and the lever 23, besides the steering mechanism of the front wheels is adjusted to the proper angular position. During the day the coupling pin 30 (Fig. 8) is pulled out of the bore 21 of the ring 20 against the resistance of the spring 31 by means of the handle 34 at the dash board as described before. The shaft 17 does therefore not participate in the swinging motion of the lever 23, and the headlights 62 are kept pointing straight ahead by the spring 81, Fig. 3 of the drawings.

When driving at night, handle 84 is released and pin 30 is forced into the bore 21 under the action of the spring 31. The lever 23 is thus coupled with the shaft 17. Arm 14 now is operated by shaft 17. Arm 14 rocks arm 15 in the manner described and this arm in turn, through rocking shaft 44, rocks double armed lever 16, which displaces the slides 49 and 50 in opposite direction. The motion of the slides is transmitted by the Bowden wires 59, 60 to the slides 73, 74, in the headlight box 64, which slides by means of pins 71, 72, and through lever 67, operate headlight shaft 66. The headlight 62 is then swung sideways against the resistance of the spring 81. Both headlights, coupled together thus follow the motion of the steering wheel 2.

Due to a certain amount of lost motion, which exists between the individual constituents of the operating mechanism and owing to the holding power of the spring 81 it is prevented, that the headlights vibrate during travel. Since the double armed operating levers 16 and 67 of boxes 11 and 64 are operated by their engaging pins at different radial distances from their shaft center in different angular positions of the arms, it becomes a simple matter to design the relative dimensions of the operating elements in the transmitting and receiving gear box, so that the headlights are turned through the proper angular range relatively to the steered wheels of the vehicle. Through the interposition of the variable angular speed mechanism shown in Fig. 6 and described hereinbefore, the headlights will be turned through larger angles at small angular deflections of the steering gear, and through smaller angles at large angular deflections of the steering gear.

The operating mechanism is so constructed and adjusted that the turning speed of the beam of light within the range of comparatively small deflections has approximately double the value of the turning speed of the steering wheels, but so that the speed of the headlight drops to a comparatively small value when the deflection increases.

In Fig. 2 of the drawings the dependence of the deflection of the headlight is plotted as ordinate against the deflection of the steering wheels as abscissa. A particularly favorable effect is obtained with a relation according to the curve shown. With this dependence the turning speed of the headlight beam is on the average greater than that of the steering wheels and within the initial range about twice as great.

Instead of the movable or pivoted members with guide slots, any other suitable mechanical equivalent may be employed.

If the design of the chassis of the automobile permits, the intermediate box 10 may sometimes be omitted and the members contained in this housing be accommodated in a box located below the headlight or below the connecting coupling rods. The flexible power transmitting means may then be dispensed with and be replaced by rigid shafts, levers and joints.

Various other modifications and changes may be made without departing from the spirit and the scope of the invention.

I claim as my invention:

1. In a device for turning vehicle headlights in accordance with the vehicle steering wheels, in combination a motion transmitter connected with the sprung portion of the steering gear, a motion receiver connected with the headlights, and a casing tightly enclosing said receiver, a flexible element of the Bowden wire type disposed between said transmitter and receiver for positively transmitting the steering gear motion in both directions to said receiver, a variable motion device disposed in series with said transmitter, said flexible element and said receiver, for transmitting to said receiver relatively positively larger motions at small displacement angles of the steering gear, and relatively smaller motions at large gear displacement angles, and a tubular sheath surrounding said flexible element, said sheath being moisture and dust proof connected to said receiver and transmitter casings.

2. In a device for turning vehicle headlights in accordance with the vehicle steering wheels, in combination a transmitter casing, a rocking shaft journalled therein and being connected with the sprung portion of the steering gear, a receiver casing and a rocking shaft journalled therein and being connected to the headlight, an operating arm on each of said rocking shafts and at least one flexible element of the Bowden wire type connecting said operating arms for transmitting the steering gear motion to said headlight, and a variable motion device disposed between said transmitter rocking shaft and said steering gear for operating said rocking shaft in either direction from the straight forward neutral position of the steering gear through greater motion angles when the steering gear is displaced a small angle from the neutral position, and for operating said rocking shaft through smaller motion angles when the steering gear is displaced a large angle from the neutral position, and a tubular sheath surrounding said flexible element and being moisture and dust proof connected to said casings.

3. In a device for turning vehicle headlights in accordance with the vehicle steering wheels, in combination a transmitter casing, a rocking shaft journalled therein and being connected with the sprung portion of the steering gear, a receiver casing and a rocking shaft journalled therein and being connected to the headlight, an operating arm on each of said rocking shafts and at least one flexible element of the Bowden wire type connecting said operating arms for positively transmitting the steering gear motion to said headlight, and a variable motion device disposed between said transmitter rocking shaft and said steering gear for operating said rocking shaft in either direction from the straight forward neutral position of the steering gear through greater motion angles when the steering gear is displaced a small angle from the neutral position, and for operating said rocking shaft through smaller motion angles when the steering gear is displaced a large angle from the neutral position, and a tubular sheath surrounding said flexible element and being moisture and dust proof connected to said casings, said sheath being flexible but having sufficient stiffness to maintain the shape in which it has been bent.

4. In a device for turning vehicle headlights in accordance with the vehicle steering wheels, in combination a transmitter casing, a rocking shaft journalled therein and being connected with the sprung portion of the steering gear, a receiver casing and a rocking shaft journalled therein and being connected to the headlight, an operating arm on each of said rocking shafts and at least one flexible element of the Bowden wire type connecting said operating arms for positively transmitting the steering gear motion to said headlight, and a variable motion device disposed between said transmitter rocking shaft and said steering gear for operating said rocking shaft in either direction from the straight forward neutral position of the steering gear through greater motion angles when the steering gear is displaced a small angle from the neutral position, and for operating said rocking shaft through smaller motion angles when the steering gear is displaced a large angle from the neutral position, and a tubular sheath surrounding said flexible element and being moisture and dust proof connected to said casings, said sheath being flexible but having sufficient stiffness to maintain the shape in which it has been bent, and straight guides for guiding the ends of said flexible element.

5. In a device for turning vehicle headlights in accordance with the vehicle steering wheels, in combination a transmitter casing, a rocking shaft journalled therein and being connected with the sprung portion of the steering gear, a receiver casing and a rocking shaft journalled therein and being connected to the headlight, an operating arm on each of said rocking shafts and at least one flexible element of the Bowden wire type connecting said operating arms for transmitting the steering gear motion to said headlight, and a variable motion device disposed between said transmitter rocking shaft and said steering gear for operating said rocking shaft in either direction from the straight forward neutral position of the steering gear through greater motion angles when the steering gear is displaced a small angle from the neutral position, and for operating said rocking shaft through smaller motion angles when the steering gear is displaced a large angle from the neutral position, and a tubular sheath surrounding said flexible element and being moisture and dust proof connected to said casings, said sheath being flexible but having sufficient stiffness to maintain the shape in which it has been bent, and a slide for each wire end in said casing to which the wire ends are connected, and a connection between each slide and the pertaining rocking arm in each casing for transmitting the motion from the transmitter arm to the receiver arm.

6. In a device for turning vehicle headlights in accordance with the vehicle steering wheels, in combination a transmitter casing, a rocking shaft journalled therein and being connected with the sprung portion of the steering gear, a receiver casing and a rocking shaft journalled therein and being connected to the headlight, an operating arm on each of said rocking shafts and at least one flexible element of the Bowden wire type connecting said operating arms for positively transmitting the steering gear motion to said headlight, and a variable motion device disposed between said transmitter rocking shaft and said steering gear and consisting of a crank arm having a shaft spaced apart from and in parallel to said transmitter rocking shaft and being connected to and operated by the steering gear, and a crank arm fixed to said transmitter rocking shaft and having a longitudinal slide pivotally attached to the end of said first-mentioned crank arm, whereby said first crank arm rocks said second crank arm in either direction, from a central neutral position of alinement between the two arms, through great motion angles when the steering gear is displaced a small angle from the straight forward neutral position, and through small motion angles when the steering gear is displaced a large angle from neutral position.

In testimony whereof I affix my signature.

FRIEDRICH RICHARD DIETRICH.